United States Patent [19]
Lew

[11] Patent Number: 5,123,287
[45] Date of Patent: Jun. 23, 1992

[54] VIBRATING CONDUIT MASS FLOWMETER

[76] Inventor: Hyok S. Lew, 7890 Oak St., Arvada, Colo. 80005

[21] Appl. No.: 440,693

[22] Filed: Nov. 24, 1989

[51] Int. Cl.$^5$ ............................................... G01F 1/84
[52] U.S. Cl. ................................................. 73/861.38
[58] Field of Search ......................... 73/861.37, 861.38

[56] References Cited

U.S. PATENT DOCUMENTS

| | | | |
|---|---|---|---|
| 4,730,501 | 3/1988 | Levien | 73/861.38 |
| 4,776,220 | 10/1988 | Lew | 73/861.38 |
| 4,811,606 | 3/1989 | Hasegawa et al. | 73/861.38 |
| 4,829,832 | 5/1989 | Lew | 83/861.38 |

*Primary Examiner*—Herbert Goldstein

[57] ABSTRACT

A mass flowmeter comprises a vibrating conduit secured to a support structure at the two extremities that includes two end sections connected by a looped midsection in such an arrangement that the two halves of the vibrating conduit over-lap one another at least once in a spaced arrangement therebetween; an electromagnetic vibrator exerting a vibratory force to the vibrating conduit at the over-lapping section, that generates relative flexural vibrations between the two halves of the vibrating conduit; and a pair of motion detectors respectively measuring the flexural vibrations of the two halves of the vibrating conduit, wherein the mass flow rate through the vibrating conduit is determined from the difference in the flexural vibrations between the two halves of the vibrating conduit.

9 Claims, 3 Drawing Sheets

VIBRATING CONDUIT MASS FLOWMETER

BACKGROUND OF THE INVENTION

One of the most popular methods for measuring the mass flow rate through a conduit involves the measurement of the flexural vibration of a section of the conduit providing the flow passage and determination of the mass flow rate from a component of the flexural vibration of the conduit, by which component the flexural vibration deviates from that of the conduit containing stationary media. For example, when a straight or curved conduit with two extremities fixedly secured to a rigid support having a configuration symmetric about the midsection thereof is vibrated laterally by an electromagnetic vibrator exerting a vibratory lateral force to the midsection of the conduit, the conduit displays a pattern of flexural vibration that is symmetric about the midsection thereof as long as there is no media moving through the conduit. The reaction by the moving media contained in the conduit to the flexural vibration of the conduit generates a secondary flexural vibration of the conduit, that is antisymmetric about the midsection of the conduit, as the media moving through the conduit absorbs the momentum of the flexural vibration from the vibrating conduit in the inlet half of the conduit and releases this momentum back to the conduit in the outlet half of the conduit. The intensity of the antisymmetric component of the flexural vibration of the conduit is directly proportional to the mass flow rate of the media moving through the conduit and, consequently, the mass flow rate can be determined from the intensity of the antisymmetric component of the flexural vibration of the conduit. In present day practice, a pair of motion detectors respectively measuring the velocities of the flexural vibrations of the two halves of the conduit provide information on the phase angle difference between the flexural vibrations of the two halves of the conduit and the mass flow rate is determined from the phase angle difference, as the amplitude of the antisymmtric component of the flexural vibration of the conduit is directly proportional to the phase angle difference as long as the amplitude of the flexural vibration remains small. The secondary flexural vibration or the antisymmetric component of the flexural vibration generated by the moving media through the conduit is usually very small in amplitude and, consequently, its measurement requires that the conduit be virtually free of other vibrations which interfere with the primary flexural vibration generated by the electromagnetic vibrator and the secondary flexural vibration generated by the reaction of the moving media to the primary flexural vibration. In present day practice of the so called "convective inertia force" or "Coriolis force" mass flowmeters, a pair of parallel conduits of identical construction providing two parallel flow passages are laterally vibrated relative to one another by an electromagnetic vibrator exerting a vibratory force to the midsection thereof in an action-reaction relationship between the two conduits, which arrangement minimizes the leak of the momentum of the flexural vibration to the supporting structure, which leak of the momentum produces vibration noises interfering with the measurement of the secondary flexural vibration of the conduit proportional to the mass flow rate through the conduits. The present day practice employing the two parallel conduits has the following disadvantages: Firstly, the two parallel conduits divide the mass flow under measurement into two equal halves and weaken the intensity of the secondary flexural vibration of each conduit that is directly proportional to the mass flow rate through each conduit, as the mass flow rate through each of the two conduits is reduced to one half of the total mass flow under measurement. As a consequence, a mass flowmeter employing the two parallel conduits bifurcating the flow greatly reduces its capability to measure the mass flow rates at low flow velocities. Secondly, the employment of the two parallel conduits increases the cost of manufacturing and makes the flowmeter expensive and bulky.

BRIEF SUMMARY OF THE INVENTION

The primary object of the present invention is to provide a vibrating conduit mass flowmeter that employs a single conduit instead of two parallel conduit.

Another object is to provide a vibrating conduit mass flowmeter including a single curved conduit, wherein the two halves of the conduit of symmetrical configuration about the midsection of the conduit over-lap one another at least once and an electromagnetic vibrator exerts a vibratory force to the over-lapping sections of the two halves of the conduit, which vibratory force generates flexural vibrations of the two halves of the conduit relative to one another, in which combination the mass flow rate of media moving through the conduit is determined from the difference in the flexural vibrations of the two halves of the conduit respectively measured by a pair of motion detectors.

A further object is to provide a vibrating conduit mass flowmeter employing a pair of Piezo electric motion sensors respectively measuring flexural vibrations of the two halves of the vibrating conduit.

Yet another object is to provide a vibrating conduit mass flowmeter comprising a pair of shallow S-shaped conduits disposed in a parallel arrangement, wherein the two conduits are laterally vibrated relative to one another by an electromagnetic vibrator disposed at the midsection of the combination of the two conduits and a pair of Piezo electric motion detectors respectively measure the relative flexural vibrations of the two halves of the combination of the two conduits.

Yet a further object is to provide a vibrating conduit mass flowmeter that employs a pair of Piezo electric motion sensors with noise canceling means.

These and other objects of the present invention will become clear as the description thereof progresses.

BRIEF DESCRIPTION OF THE FIGURES

The present invention may be described with a great clarity and specificity by referring to the following figures.

DESCRIPTION OF THE ILLUSTRATED EMBODIMENTS

Figure 1:
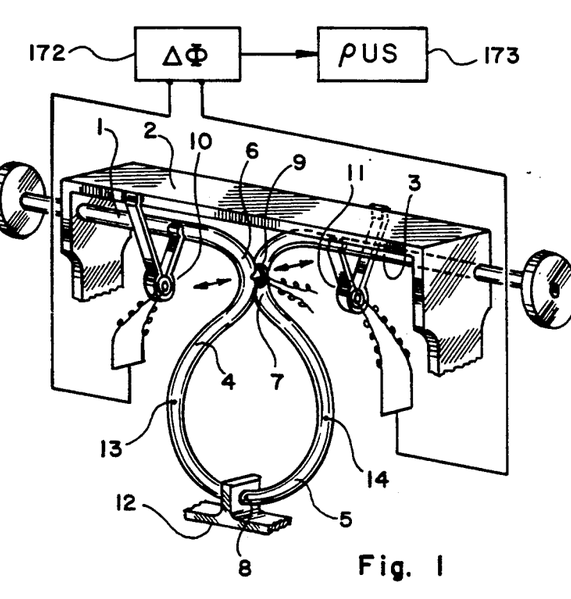
FIG. 1 illustrates a perspective view of an embodiment of the vibrating conduit mass flowmeter.

In FIG. 1 there is illustrated a perspective view of an embodiment of the vibrating conduit mass flowmeter constructed in accordance with the principles of the present invention. A first section of the conduit with its extremity fixedly secured to a support structure 2 and a second section 3 of the conduit with its extremity fixedly secured to the support structure 2 respectively disposed on two planes extend towards one another in a cantilever-like arrangement, wherein the two sections 1 and 3 of the conduit are connected to one another by a curved midsection 4 including a looped section 5 turning in a first direction intermediate a pair of curved sections 6 and 7 turning in a second direction opposite to the first direction, wherein the extremities of the curved sections 6 and 7 are respectively connected to the extremities of the first and second sections 1 and 3 of the conduit. It should be noted that at least a portion of the curved section 6 over-laps a portion of the curved section 7 in an arrangement with a space therebetween. The conduit has a symmetric configuration about the middle section 8. A vibrating means 9 such as an electromagnetic vibrator energized by an alternating electrical current is disposed at the over-lapping section of the conduit, and exerts a vibratory force that generates flexural vibrations of the conduit in an antisymmetric pattern with respect to the middle section 8. A pair of motion sensors 10 and 11 respectively measure the flexural vibrations of the first and second sections 1 and 2 of the conduit. The pair of motion sensors 10 and 11 may be Piezo electric type motion sensors as shown in the particular illustrated embodiment, or the magnetic induation coil type motion sensors commonly employed in the existing vibrating conduit mass flowmeters. It should be understood that the vibrating conduit supported by the support structure 2 at the two extremities thereof is substantially free of any restraints preventing the flexural vibrations of the conduit. Since the flexural vibration of the conduit is antisymmetric about the middle section 8, the middle section 8 experiences little flexural vibration in general. As a consequence, it is an optional matter to secure the middle section 8 to the support structure 12 connected to the support structure 2 as shown in the particular illustrated embodiment or to leave the middle section 8 free of any support.

Figure 3:
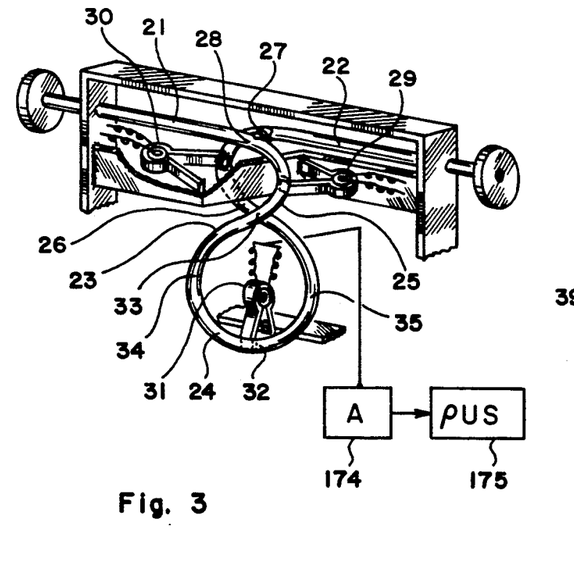
FIG. 3 illustrates a perspective view of another embodiment of the vibrating conduit mass flowmeter.

When there is no mass flow of media moving through the conduit, the flexural vibration of the conduit is antisymmetric about the middle section. A mass flow of media moving through the conduit generates a secondary flexural vibration of the conduit that is symmetric about the middle section 8 wherein the intensity of the secondary flexural vibration is proportional to the mass flow rate of media moving through the conduit. The mass flow rate is determined by measuring the intensity of the secondary flexural vibration. One of the most preferred methods for measuring the intensity of the secondary flexural vibration is to measure the phase angle difference between the two motions respectively measured by the two motion sensors 10 and 11, as the phase angle difference is proportional to the intensity of the secondary flexural vibration of the conduit. A vibratory motion analyzer 172 shown in FIG. 1 determines the phase angle difference $\Delta\phi$ by comparing the two electrical signals respectively supplied by the two motion sensors 10 and 11, and a data processor 173 determines the mass flow rate $\rho US$ from the phase angle difference $\Delta\phi$, where $\rho$ is the density of media, U is the velocity of media and S is the cross sectional area of the flow passage provided by the vibrating conduit. Another method is to measure the amplitude of the flexural vibration of the conduit at the middle section 8 when it is not secured to a support structure as shown in FIG. 3. The middle section 8 is a nodal section as long as there is no secondary flexural vibration. The amplitude of the flexural vibration measured at the middle section 8 is proportional to the intensity of the secondary flexural vibration and, consequently, the mass flow rate can be determined from the amplitude of the flexural vibration measured at the middle section 8 which is the nodal section in the primary flexural vibration. A vibratory motion analyzer 174 shown in FIG. 3 determines the amplitude A of the vibratory motion measured by the motion sensor 31 and a data processor 175 determines the mass flow rate $\rho US$ from the amplitude A. It is generally desirable to vibrate the conduit at the natural frequency. The natural frequency of the conduit containing a variable density fluid can vary in time. Therefore, the vibrating conduit mass flowmeter may include a natural frequency detector and the frequency of the alternating current energizing the electromagnetic vibrator 9 is automatically matched to the natural frequency detected by the natural frequency detector. It should be mentioned that the pair of motion detectors 10 and 11 may be included in the curved midsection 4 instead of the first and second sections 1 and 3, wherein the two motion detectors respectively measure the flexural vibrations of the conduit at two sections 13 and 14 of the looped section 5 located symmetrically about the middle section 8.

Figure 2:
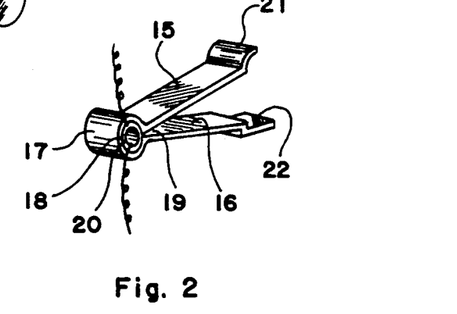
FIG. 2 illustrates an embodiment of the Piezo electric motion sensor usable in conjunction with the vibrating conduit mass flowmeter.

In FIG. 2 there is illustrated a perspective view of an embodiment of the Piezo electric type motion sensor usable in the construction of the vibrating conduit mass flowmeter such as those shown in FIGS. 1, 4, 5, 6, 7 and 8. The Piezo electric motion sensor comprises a pair of elongated members 15 and 16 extending from an extremity 17 that includes a circular cylindrical hole 18 with a slit opening 19 disposed intermediate the two elongated members 15 and 16. A circular cylindrical shell Piezo electric element 20 is pressure-fitted into the circular cylindrical hole 18. The extremities of the elongated members 15 16 respectively include means 21 and 22 for affixing to the vibrating conduit and the rigid support structure. A relative movement between the two elongated members 15 and 16 increases or decreases the squeezing pressure on the Piezo electric shell element 20 and generates an electromotive force therefrom.

In FIG. 3 there is illustrated a perspective view of another embodiment of the vibrating conduit mass flowmeter that has a construction similar to the embodiment shown in FIG. 1. The two end sections 21 and 22 of the vibrating conduit extending generally towards one another in a cantilever-like arrangement are connected to one another by a curved midsection 23 including a looped section 24 turning in a first direction intermediate two curved sections 25 and 26 turning in a second direction opposite to the first direction. The curved sections 25 and 26 of the conduit over-shoot and over-lap one another in a spaced relationship therebetween. An electromagnetic vibrator 27 disposed at the first over-lapping section 28 generates relative flexural vibrations of the conduit between the two halves of the conduit. A pair of motion detectors 29 and 30 respectively measure the flexural vibrations of the curved sections 25 and 26. The mass flow rate through the conduit is determined from the difference between the two flexural vibrations respectively detected by the two motion detectors 29 and 39, which difference in the flexural vibration obtained in the form of the phase angle difference between the two flexural vibrations respectively measured by the two motion detectors 29 and 30 represents the secondary flexural vibration created by the reaction of the moving media through the conduit to the primary flexural vibration generated by the electromagnetic vibrator 27. Alternately the mass flow rate may be determined from the amplitude of the secondary flexural vibration measured by a third motion detector 31 disposed at the nodal section of the primary flexural vibration, which nodal point coincides with middle section 32 of the conduit. In an embodiment wherein the third motion detector is absent, the middle section 32 may be secured to a rigid support structure anchoring the two extremities of the vibrating conduit as shown in FIG. 1 or may be left free of support. As an alternative to the design shown in the particular embodiment, the electromagnetic vibrator 27 may be moved to a second over-lapping section 33 and/or the two motion detectors 29 and 30 may be respectively moved to the two sections 34 and 35 located symmetrically about the middle section 32 in the looped section 23 of the conduit.

Figure 4:
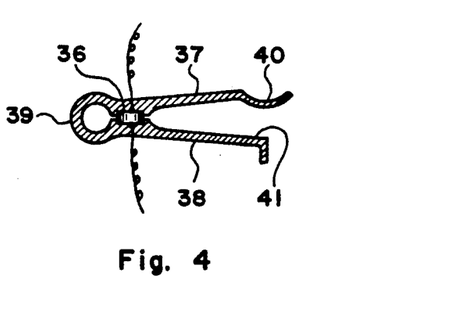
FIG. 4 illustrates another embodiment of the Piezo electric motion sensor usable in the construction of the vibrating conduit mass flowmeter.

In FIG. 3 there is illustrated a cross section of another embodiment of the Piezo electric type motion sensor having a construction similar to the embodiment shown in FIG. 2 with one exception. In place of the circular cylindrical shell Piezo electric element, a planar Piezo electric element 36 is disposed between the two elongated members 37 and 38 in a squeezing and retaining relationship intermediate the extremity 39 anchoring the two elongated members 37 and 38 in a spring biased arrangement and the extremities of the two elongated members respectively including means 40 and 41 for affixing to the vibrating conduit and the rigid support structure, respectively.

Figure 5:
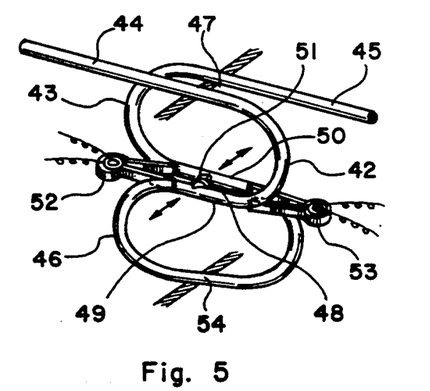
FIG. 5 illustrates a further embodiment of the vibrating conduit mass flowmeter.

In FIG. 5 there is illustrated a perspective view of a further embodiment of the vibrating conduit mass flowmeter. In this embodiment, a first and second curved sections 42 and 43 respectively adjacent to the inlet and outlet sections 44 and 45, which are respectively disposed on two generally parallel planes, are connected to one another by a looped midsection 46 of the conduit, wherein the two halves of the conduit over-lap twice at two over-lapping sections 47 and 48. At the second over-lapping section 48, two generally straight sections 49 and 50 of a substantial length respectively belonging to the two halves of the conduit run parallel to one another, which two generally straight sections are laterally vibrated relative to one another by an electromagnetic vibrator 51 disposed at the middle point thereof. A pair of motion detectors 52 and 53 respectively measure the relative flexural vibrations of the two generally straight and parallel sections 49 and 50 of the conduit at the two extremities thereof. The structural vibration noises can be minimized by anchoring the conduit at the first over-lapping section 47 and the middle section 54 of the conduit. As an alternative design, the conduit may be anchored at the inlet and outlet sections 44 and 45. The middle setion 54 may be left free without any restraint. The mass flow rate is determined from the difference in the flexural vibrations of the two halves of the conduit measured by the two motion detectors 52 and 53 such as the phase angle difference therebetween.

Figure 6:
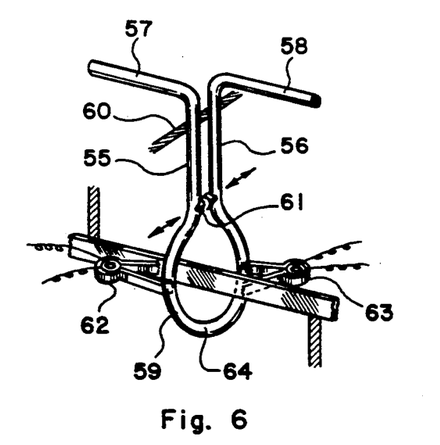
FIG. 6 illustrates yet another embodiment of the vibrating conduit mass flowmeter.

In FIG. 6 there is illustrated a perspective view of yet another embodiment of the vibrating conduit mass flowmeter, which comprises two generally straight and parallel sections 55 and 56 of the conduit respectively extending from the inlet and outlet sections 57 and 58, and connected to one another by a looped midsection 59 of the conduit, wherein the extremities of the two generally straight sections 55 and 56 are secured to a rigid support structure 60. An electromagnetic vibrator 61 vibrates the two halves of the conduit relative to one another. A pair of motion sensors 62 and 63 measure the flexural vibrations of the looped midsection 59 at two sections symmetrically located about the middle section 64. The mass flow rate through the conduit is determined from the difference in the two flexural vibrations respectively measured by the two motion sensors 62 and 63 such as the phase angle difference therebetween. Alternately, the mass flow rate may be determined from the amplitude of the secondary flexural vibration measured by a third motion sensor disposed at the middle section 64 that is the nodal section of the primary flexural vibration generated by the electromagnetic vibrator 61. In an embodiment wherein the third motion sensor is absent, the middle section 64 may be secured to a support structure or left free from any restraint.

Figure 7:
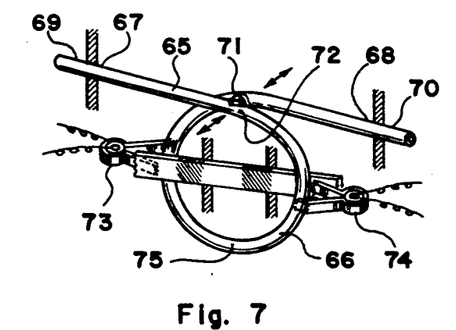
FIG. 7 illustrates yet a further embodiment of the vibrating conduit mass flowmeter.

In FIG. 7 there is illustrated a perspective view of yet a further embodiment of the vibrating conduit mass flowmeter, that comprises a conduit 65 including a 360 degree loop 66, which conduit is secured to a support structure at the two extremities 67 and 68 respectively connected to the inlet and outlet sections 69 and 70. An electromagnetic vibrator 71 disposed at the over-lapping section 72 vibrates the two halves of the conduit 65 relative to one another. A pair of motion detectors 73 and 74 respectively measure the flexural vibration of the looped midsection 66 at two sections symmetrically located about the middle section 75. The mass flow rate is determined from the difference in the two flexural vibrations respectively measured by the two motion sensors 73 and 74 such as the phase angle difference therebetween. Alternatively, the mass flow rate may be determined from the amplitude of the secondary flexural vibration measured by a third motion detector disposed at the middle section 75 that is the nodal section of the primary flexural vibration generated by the electromagnetic vibrator 71. In an embodiment wherein the third motion detector is absent as shown in the particular illustrated embodiment, the middle section 75 may secured to a support structure or left free from any restraint.

Figure 8:
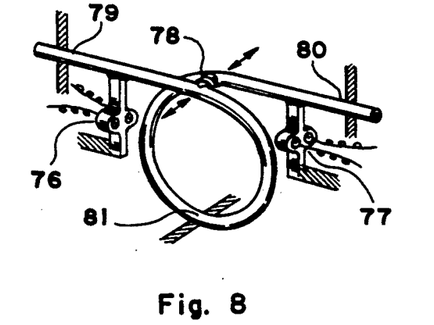
FIG. 8 illustrates still another embodiment of the vibrating conduit mass flowmeter.

In FIG. 8 there is illustrated still another embodiment of the vibrating conduit mass flowmeter having essentially the same construction as the embodiment shown in FIG. 7 with one exception, which is that the two motion detectors 76 and 77 measure the flexural vibrations at two sections intermediate the overlapping section 78 and the two extremities 79 and 80 of the vibrating conduit. This embodiment operates on the same principles as those of the embodiment shown in FIG. 7. The middle section 81 of the vibrating conduit may be secured to a support structure as shown in FIG. 8 or left free as shown in FIG. 7 in an embodiment wherein the third motion sensor measuring the amplitude of the secondary flexural vibration at the middle section 81 is absent.

Figures 9, 10:
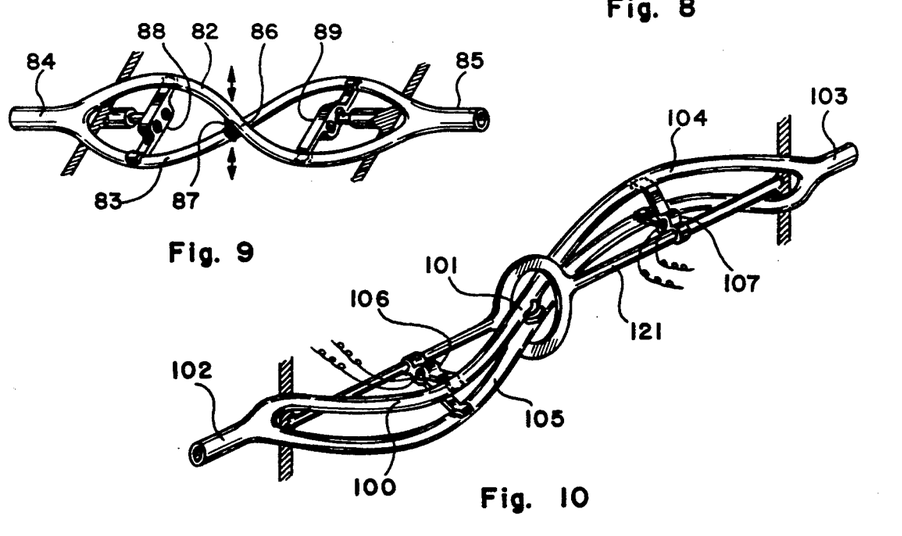
FIG. 9 illustrates an embodiment of the vibrating conduit mass flowmeter comprising a pair of shallow S-shaped conduits.
FIG. 10 illustrates another embodiment of the vibrating conduit mass flowmeter employing a pair of shallow S-shaped conduits.

In FIG. 9 there is illustrated a perspective view of an embodiment of the vibrating conduit mass flowmeter that comprises a pair of S-shaped conduits 82 and 83 connected to the common inlet and outlet conduits 84 and 85. Two identical S-shaped conduits 82 and 83 are disposed in an axisymmetric arrangement about the common central axis of the inlet and outlet conduits 84 and 85, wherein the two S-shaped conduits 82 and 83 cross one another in a spaced relationship therebetween at the middle section. The extremities of the S-shaped conduits are secured to a support structure. An electromagnetic vibrator disposed at the crossing section 86 vibrates the two S-shaped conduits relative to one another at a natural frequency thereof. A pair of relative motion sensors 88 and 89 respectively measure the relative flexural vibration between the first halves of the two S-shaped conduits and that between the second halves thereof. The mass flow rate is determined from the difference between the two relative flexural vibrations respectively measured by the two relative motion sensors 88 and 89 such as the phase angle difference therebetween. In place of the extremities of the two S-shaped conduits, the inlet and outlet conduits 84 and 85 may be secured to the support structure. An embodiment of the relative motion sensor particularly adapted to the embodiment shown in FIG. 9 is illustrated in FIG. 11.

In FIG. 10 there is illustrated a perspective view of another embodiment of the vibrating conduit mass flowmeter, that employs a pair of S-shaped conduits. One curved half 100 of the first S-shaped conduit 101 is on one side of a plane including the common central axis of the inlet and outlet conduits 102 and 103, while the other curved half 104 of the first S-shaped conduit 101 is on the other side of that plane. The second S-shaped conduit 105 having a configuration identical to that of the first S-shaped conduit 101 is disposed parallel to the first S-shaped conduit 101 in a spaced arrangement therebetween, wherein the first extremities of the two S-shaped conduits 101 and 105 are connected to the inlet conduit 102, while the second extremities thereof are connected to the outlet conduit 103. An electromagnetic vibrator disposed at the midsection of the combination of the two S-shaped conduits 101 and 105 vibrates the two S-shaped conduits relative to one another at a natural frequency. A pair of relative motion detectors 106 and 107 respectively measure the relative flexural vibration between the first curved halves of the two S-shaped conduits 101 and 105 and that between the second curved halves thereof. The mass flow rates through the two S-shaped conduits 101 and 105 are determined from the difference between the two relative flexural vibrations respectively measured by the two relative motion sensors 106 and 107 such as the phase angle difference therebetween. The embodiments of the relative motion sensor particularly adapted to the mass flowmeter shown in FIG. 10 are illustrated in FIGS. 12, 13, 14 and 15.

Figures 11, 12, 13, 14, 15, 16, 17, 18, 19:
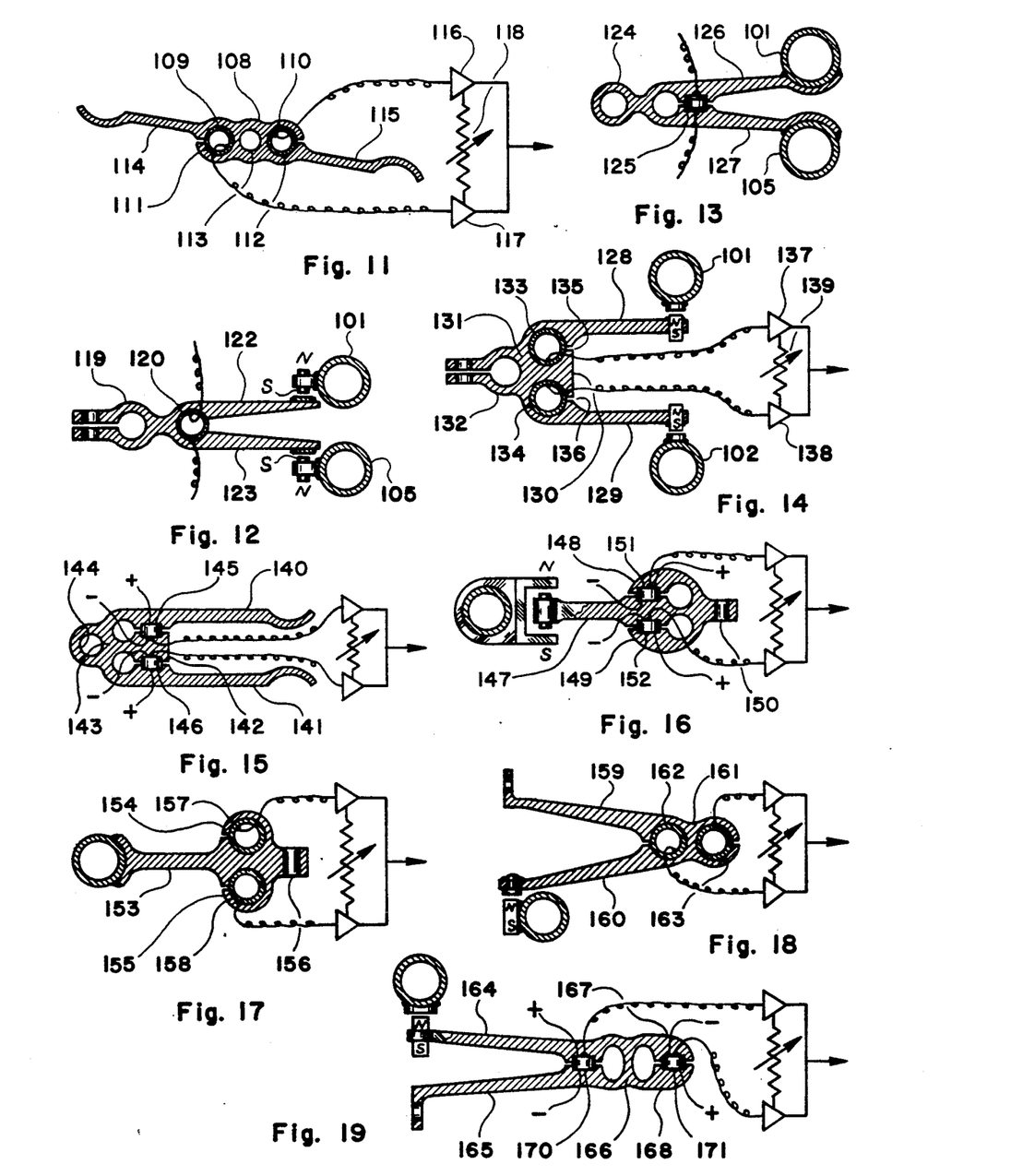
FIG. 11 illustrates an embodiment of the Piezo electric motion sensor usable in the construction of the vibrating conduit mass flowmeter shown in FIG. 9.
FIG. 12 illustrates an embodiment of the relative motion sensor usable in the construction of the vibrating conduit mass flowmeter shown in FIG. 10.
FIG. 13 illustrates another embodiment of the relative motion sensor usable in conjunction with the vibrating conduit mass flowmeter shown in FIG. 10.
FIG. 14 illustrates a further embodiment of the relative motion sensor usable in conjunction with the vibrating conduit mass flowmeter shown in FIG. 10.
FIG. 15 illustrates yet another embodiment of the relative motion sensor usable in the construction of the vibrating conduit mass flowmeter shown in FIG. 10.
FIG. 16 illustrates an embodiment of the Piezo electric motion sensor with a noise canceling electronic circuit.
FIG. 17 illustrates another embodiment of the Piezo electric motion sensor with a noise canceling electronic circuit.
FIG. 18 illustrates a further embodiment of the Piezo electric motion sensor with a noise canceling electronic circuit.
FIG. 19 illustrates yet another embodiment of the Piezo electric motion sensor with a noise canceling means.

In FIG. 11 there is illustrated an embodiment of the Piezo electric motion sensor particularly suitable for the construction of the vibrating conduit mass flowmeter shown in FIG. 9. The stocky midsection 108 of the motion sensor includes a pair of circular cylindrical shell Piezo electric elements 109 and 110 respectively confined in two circular holes with slit openings 111 and 112, and an anchoring hole 113 disposed intermediate the two Piezo electric elements, that is for fixedly securing the motion sensor to the rigid support structure anchoring the extremities of the vibrating conduit. A pair of elongated members 114 and 115, anchored to the stocky midsection 108 adjacent to the two Piezo electric elements 109 and 110, extend in two opposite directions in an axisymmetric pattern about the anchoring hole 113. The extremities of the two elongated members 114 and 115 may be mechanically affixed to the two conduits under relative flexural vibrations or may be magnetically coupled to the flexural vibrations of the conduits as shown in FIG. 12 or 13. The two electrodes with the same polarity respectively included in the two circular cylindrical shell Piezo electric elements 109 and 110 are respectively connected to two amplifiers 116 and 117 including a signal balancing means 118 therebetween. The outputs from the two amplifiers 116 and 117 are combined in such a way that the noises generated by the structural vibrations of the supporting structure are cancelled and a refined signal representing the relative flexural vibration between the two S-tubes 82 and 83 is obtained, which is accomplished by appropriately setting the signal balancing means 118.

In FIG. 12 there is illustrated an embodiment of the Piezo electric motion sensor usable in conjunction with the vibrating conduit mass flowmeter shown in FIG. 10. This sensor has essentially the same construction as the embodiment shown in FIG. 2 with two exceptions. The first exception is fastening means 119 extending from one extremity of the motion sensor including the circular cylindrical shell Piezo electrical element 120, which is for anchoring the motion sensor to a support member such as the elongated structural member 121 disposed intermediate the inlet and outlet conduits 102 and 103 and affixed to the support structure anchoring the extremities of the vibrating conduits as shown in FIG. 10. The second exception is the magnetic coupling of the extremities of the two elongated members 121 and 122 to the flexural vibrations of the conduits 101 and 105 in place of the mechanical fastening thereto. Of course, the magnetic motion coupling may be replaced by the fixed mechanical fastening as shown in FIG. 13.

In FIG. 13 there is illustrated another embodiment of the Piezo electric motion sensor usable in the construction of the vibrating conduit mass flowmeter, which has essentially the same construction as the embodiment shown in FIG. 4, which exception is the anchoring means 124 extending from one extremity of the motion sensor including the planar Piezo electric element 125. The mechanical fastening means which connect the extremities of the two elongated members 126 and 127 to the two conduits 101 and 105 may be replaced by the magnetic motion coupling means as shwon in FIG. 12.

In FIG. 14 there is illustrated an embodiment of the Piezo electric motion sensor including means for noise cancellation, that can be employed in the construction of the vibrating conduit mass flowmeter shown in FIG. 10. A pair of elongated members 128 and 129, and a stub member 130 disposed therebetween merge to form a common section 131 that includes securing means 132 affixed thereto. A pair of circular cylindrical shell Piezo electric elements 133 and 134 are respectively retained in two circular holes in a squeezing relationship, wherein the two circular holes respectively disposed intermediate the elongated member 128 and the stub member 130, and the elongated member 129 and the stub member 130 have slit openings 135 and 136 separating the elongated members 128 and 129 from the stub member 130. The extremities of the two elongated members are magnetically coupled to the flexural movements of the conduits 101 and 102 in the particular illustrative embodiment, which extremities may be affixed to the two conduits as shown in FIG. 13 in an alternative design. The two electrodes with identical polarity respectively included in the two circularly cylindrical shell Piezo electric elements 133 and 134 are respectively connected to a pair of amplifiers 137 and 138 including a signal balancing means 139 therebetween. The outputs from the two amplifiers 137 and 138 are combined in such a way that the noises generated by the structural vibrations of the supporting structure are cancelled and a refined signal representing the relative flexural vibrations between the conduits 101 and 105 is obtained, which is accomplished by appropriately setting the signal balancing means 139.

In FIG. 15 there is illustrated another embodiment of the Piezo electric motion sensor including a means for noise cancellation, that can be employed in the construction of the vibrating conduit mass flowmeter shown in FIG. 10. A pair of elongated members 140 and 141, and a stub member 142 disposed intermediate therebetween merge to form a common section 143 that includes securing means 144 for fastening to the support structure. A pair of planar Piezo electric elements 145 and 146 are respectively disposed intermediate the elongated member 140 and the stub member 142, and the elongated member 141 and the stub member 142 in a squeezing and retaining arrangement. It is preferred that the two planar Piezo electric elements 145 and 146 are oriented in such a way that the directions of the polarization thereof are opposite to one another. The extremities of the two elongated members 140 and 141 may be magnetically coupled to the flexural vibrations of the two S-tubes as shown in FIG. 12 or 14 or fixedly fastened thereto. The two electrodes with the same polarity respectively included in the two planar Piezo electric elements 145 and 146 are respectively connected to a pair of amplifiers with a signal balancing means as described in conjunction with FIG. 14. It should be mentioned that the Piezo electric motion sensors shown in FIGS. 12, 13, 14 and 15 can be employed in the construction of the vibrating conduit mass flowmeters shown in FIGS. 1, 3, 5, 6, 7 and 8, wherein one elongated member should be affixed to the support frame and the other elongated member can be magnetically coupled to the flexural vibration of the vibrating conduit or fixedly fastened thereto. In such an application, the fastening means for securing the Piezo electric motion sensors shown in FIGS. 12, 13, 14 and 15 may be omitted or retained and fastened to the support structure anchoring the extremities of the vibrating conduit.

In FIG. 16 there is illustrated an embodiment of the Piezo electric motion sensor with a noise cancelling means, that can be employed in the construction of the vibrating conduit mass flowmeters shown in FIGS. 1, 3, 5, 6, 7 and 8. An elongated member 147 and a pair of stub members 148 and 149 sandwiching the elongated member 147 in a spaced relationship therebetween merge to from a common section 150 that includes a fastening means for securing the motion sensor to the support structure anchoring the two extremities of the vibrating conduit. A pair of planar Piezo electric elements 151 and 152 are respectively disposed intermediate the stub member 148 and the elongated member 147, and the stub member 149 and the elongated member 147 in a squeezing and retaining relationship. It is preferred that the two planar Piezo electric elements 151 and 152 are oriented in such a way that the directions of polarization thereof are opposite to one another. The two electrodes with opposite polarity respectively included in the two planar Piezo electric elements 151 and 152 are respectively connected to a pair of amplifiers with a signal balancing means as described in conjunction with FIG. 14. The extremity of the elongated member 147 may be magnetically coupled to the flexural vibration of the vibrating conduit as shown in the particular illustrative embodiment or may be fixedly fastened thereto.

In FIG. 17 there is illustrated another embodiment of the Piezo electric motion sensor usable in place of the embodiment shown in FIG. 16. The elongated member 153 and a pair of stub members 154 and 155 sandwiching the elongated member 153 in a spaced relationship therebetween merge to form a common section that includes a fastening means 156 for securing the motion sensor to the supporting structure anchoring the two extremities of the vibrating conduit. The spacings between the elongated member 153 and the stub members 154 and 155 include circular openings which retain a pair of circular cylindrical shell Piezo electric elements 157 and 158. The two electrodes with opposite polarity respectively included in the two circular cylindrical Piezo electric elements 157 and 158 are respectively connected to a pair of amplifiers with a signal balancing means as described in conjunction with FIG. 14. The extremity of the elongated member 153 may be magnetically coupled to the flexural vibration of the vibrating conduit or fixedly fastened thereto.

In FIG. 18 there is illustrated a further embodiment of the Piezo electric motion sensor usable in place of the embodiment shown in FIG. 16. A pair of elongated members 159 and 160 merge to form a common section 161 that includes a pair of circular holes with centers located on a plane intermediate the two elongated members 159 and 160, wherein the two circular holes have slit openings respectively open to the two opposite extremities of the common section 161. A pair of circular cylindrical shell Piezo electric elements 162 and 163 are respectively confined in the two circular holes in a squeezed arrangement. Two electrodes with opposite polarity respectively included in the two circular cylindrical shell Piezo electric elements 162 and 163 are respectively connected to a pair of amplifiers with a signal balancing means as described in conjunction with FIG. 14. The extremity of one elongated member 159 must be affixed to the support structure anchoring the two extremities of the vibrating conduit, while the extremity of the other elongated member 160 may be magnetically coupled to the vibration motion of the conduit or fixedly fastened thereto.

In FIG. 19 there is illustrated yet another embodiment of the Piezo electric motion sensor usable in place of the embodiment shown in FIG. 16. A pair of elongated members 164 and 165 merge to form a common section 166, from which a pair of stub members 167 and 168 extends in a direction opposite to the two elongated members 164 and 165. A pair of planar Piezo electric elements 169 and 170 are respectively disposed intermediate the two elongated members 164 and 165 and intermediate the two stub members 167 and 168 in a squeezing and retaining relationship, wherein the two planar Piezo electric elements 170 and 171 are oriented in such a way that the direction of the polarizations thereof are opposite to one another. Two electrodes with opposite polarity respectively belonging to the two planar Piezo electric elements 170 and 171 are respectively connected to a pair of amplifiers with a signal balancing means as described in conjunction with FIG. 14. The extremity of one elongated member 164 may be magnetically coupled to the vibrating motion of the conduit or fixedly fastened thereto, while the extremity of the other elongated member 165 must be affixed to the support structure anchoring the two extremities of the vibrating conduit.

It should be understood that the motion sensors employed in the vibrating conduit mass flowmeter may be Piezo electric types as shown in the illustrative embodiments, or induction, capacitive or resistive types which are well known to those skilled in the art of measurement technologies. While the principles of the present inventions have now been made clear by the illustrative embodiments, there will be many modifications of the structures, arrangements, proportions, elements and materials immediately obvious to those skilled in the art, which are particularly adapted to the specific working environments and operating conditions in the practice of the invention without departing from those principles. It is not desired to limit the invention to those particular illustrative embodiments shown and described, and, accordingly, all suitable modifications and equivalents may be regarded as falling within the scope of the invention as defined by the claims which follow.

The embodiments of the invention in which an exclusive property or priviledge is claimed, are defined as follows:

1. An apparatus for measuring flow rate of media comprising in combination:
    a) a conduit secured to a support at least two extremities of the conduit including a first half of the conduit disposed substantially on a first plane and a second half of the conduit disposed substantially on a second plane, said first and second planes intersecting one another at midsection of the conduit, wherein the conduit includes a first curved end section disposed adjacent to one of the two extremities of the conduit and turning media moving therethrough in a first direction, a curved midsection turning media moving therethrough in a second direction opposite to said first direction, and a second curved end section disposed adjacent to the other of the two extremities of the conduit and turning media moving therethrough in a third direction opposite to said second direction; said first and second halves of the conduit over-lapping one another at least once with a space therebetween;
    b) means for exerting a vibratory force to said first and second halves of the conduit at a section of said over-lapping, said vibratory force generating flexural vibrations of said first and second halves of the conduit relative to one another; and
    c) means for determining difference in the flexural vibration between said first and second halves of the conduit as a measure of flow rate of media moving through the conduit, said means for determining difference in the flexural vibration comprising a pair of motion detectors respectively measuring the flexural vibrations of said first and second halves of the conduit, each of said pair of motion detectors comprising a pair of elongated members connected to one another at first extremities thereof and respectively secured to one of the first and second halves of the conduit and a support member at second extremities thereof, wherein at least one piezo electric element is disposed between the pair of elongated members in a squeezed arrangement therebetween, whereby flexural vibration of said one of the first and second halves of the conduit relative to said support member generates an electrical singal representing said relative flexural vibration from the piezo electric element.

2. A combination as set forth in claim 1 wherein a midsection of the conduit is secured to the support.

3. An apparatus for measuring flow rate of media comprising in combination:
    a) a conduit secured to a support at least two extremities of the conduit including a first half of the conduit disposed substantially on a first plane and a second half of the conduit disposed substantially on a second plane, said first and second planes intersecting one another at midsection of the conduit, wherein the conduit includes a first curved end section disposed adjacent to one of the two extremities of the conduit and turning media moving therethrough in a first direction, a curved midsection turning media moving therethrough in a second direction opposite to said first direction, and a second curved end section disposed adjacent to the other of the two extremities of the conduit and turning media moving therethrough in a third direction opposite to said second direction; said first and second halves of the conduit over-lapping one another at least once with a space therebetween;
    a) means for exerting a vibratory force to said first and second halves of the conduit at a section of said over-lapping, said vibratory force generating flexural vibrations of said first and second halves of the conduit relative to one another; and c) means for determining difference in the flexural vibration between said first and second halves of the conduit as a measure of flow rate of media moving through the conduit, wherein said means for determining difference in the flexural vibration includes at least one motion detector disposed at a midsection of the conduit where the flexural vibration of the conduit substantially vanishes when the media contained in the conduit is stationary.

4. A combination as set forth in claim 3 wherein said motion detector comprises a pair of elongated members connected to one another at first extremities thereof and respectively secured to the midsection of the conduit and a support member at second extremities thereof, wherein at least one piezo electric element is disposed between the pair of elongated members in a squeezed arrangement therebetween, whereby flexural vibration of the midsection of said conduit relative to said support member generates an electrical signal representing said relative flexural vibration from the piezo electric element.

5. An apparatus for measuring flow rate of media comprising in combination:
a) a conduit secured to a support at least two extremities of the conduit including a first half of the conduit disposed substantially on a first plane and a second half of the conduit disposed substantially on a second plane, said first and second planes intersecting one another at midsection of the conduit, wherein the conduit includes a first curved end section disposed adjacent to one of the two extremities of the conduit and turning media moving therethrough in a first direction, a curved midsection turning media moving therethrough in a second direction opposite to said first direction, and a second curved end section disposed adjacent to the other of the two extremities of the conduit and turning media moving therethrough in a third direction opposite to said second direction; said first and second halves of the conduit over-lapping one another at least once with a space therebeteen; wherein a section of said first half of the conduit intermediate said first curved end section and said curved midsection, and a section of said second half of the conduit intermediate said second curved end section and said curved midsection are disposed substantially parallel to one another;
b) means for exerting a vibratory force to said first and second halves of the conduit at a section of said over-lapping, said vibratory force generating flexural vibrations of said first ans second halves of the conduit relative to one another; and
c) means for determining difference in the flexural vibration between said first and second halves of the conduit as a measure of flow rate of media moving through the conduit, wherein said means for determining difference in the flexural vibration includes a pair of motion detectors measuring relative flexural vibration between said two parallel sections of the conduit resepctively at two locations located on the two opposite sides of the midsection of said combination of the two parallel sections of the conduit.

6. A combination as set forth in claim 5 wherein each of said pair of motion detectors comprises a pair of elongated members connected to one another at first extremities thereof and respectively secured to said two parallel sections of the conduit at second extremities thereof, wherein at least one piezo electric element is disposed between the pair of elongnated members in a squeezed arrangement therebetween, whereby relative flexural vibration between said two parallel sections of the conduit generates an electrical signal representing said relative flexural vibration from the piezo electric element.

7. A combination as set forth in claim 6 wherein a midsection of the conduit is secured to the support.

8. An apparatus for measuring flow rate of media comprising in combination:
a) a first conduit disposed on a first plane with two extremities respectively connected to an inlet conduit and an outlet conduit, said first conduit including a first curved half disposed adjacent to the inlet conduit and turning media moving therethrough in a first direction, and a second curved half disposed adjacent to the outlet conduit and turning media moving therethrough in a second direction opposite to said first direction;
b) a second conduit having a geometry substantially identical to the geometry of the first conduit and two extremities respectively connected to said inlet and outlet conduits disposed on a second plane parallel to the first plane in an axisymmetric arrangement about a hypothetical axis located intermediate and parallel to said first and second planes;
c) means for exerting a vibratory force to midsections of said first and second conduits, said vibratory force generating flexural vibrations of said first and second conduits relative to one another; d) a first motion detector comprising a pair of elongated members respectively extending from a transducer holder in two opposite directions, wherein extremities of the pair of elongated members are respectively secured to first curved halves of said first and second conduits and a pair of piezo electric elements are resepctively disposed between said transducer holder and one of said pair of elongated members and between said transducer holder and the other of said pair of elongated members in a squeezed arrangement; wherein a combination of electrical signals generated by said pair of piezo electric elements provides a signal representing relative flexural vibration between first curved halves of said first and second conduit; and
e) a second motion detector comprising a pair of elongated members respectively extending from a transducer holder in two opposite directions, wherein extremities of the pair of elongated members are respectively secured to second curved halves of said first and second conduits, and a pair of piezo electric elements are respectively disposed between said transducer holder and one of said pair of elongated members and between said transducer holder and the other of said pair of elongated members in a squeezed arrangement; wherein a combination of electrical signals generated by said pair of piezo electric elements provides a signal representing relative flexural vibration between secured curved halves of said first and second conduits;
wherein flow rate of media moving through the first and second conduits is determined from a difference between two signals respectively provided by said first and second motion detectors.

9. An apparatus for measuring flow rate comprising in combination:

a) a first conduit disposed on a first plane with two extremities respectively connected to an inlet conduit and an outlet conduit, said first conduit including a first curved half disposed adjacent to the inlet conduit and turning media moving therethrough in a first direction, and a second curved half disposed adjacent to the outlet conduit and turning media moving therethrough in a second direction opposite to said first direction;

b) a second conduit having a geometry substantially identical to the geometry of the first conduit and having two extremities respectively connected to said inlet and outlet conduits disposed on a second plane parallel to the first plane in a parallel relationship to the first conduit;

c) means for exerting vibratory force to midsections of said first and second conduits, said vibratory force generating flexural vibrations of said first and second conduits relative to one another;

d) a first motion detector comprising a pair of elongated members connected to one another at first extremities thereof extending towards a substantially common direction, wherein second extremities of the pair of elongated members are respectively secured to first curved halves of said first and second conduits, and at least one piezo electric element is disposed between the pair of elongated members in a squeezed arrangement therebetween, whereby relative flexural vibration between first curved halves of said first and second conduits generates an electrical signal representing said relative flexural vibration from said piezo electric element; and e) a second motion detector comprising a pair of elongated members coonected to one another at first extermities thereof extending towards a substantially common direction, wherein second extremities of the pair of elongated members are respectively secured to second curved halves of said first and second conduits, and at least one piezo electric element is disposed between the pair of elongated members in a squeezed arrangement therebètween, whereby relative flexural vibration between second curved halves of said first and second conduits generated an electrical signal representing said relative flexural vibration from said piezo electric element;

wherein flow rate of media moving through the first and second conduits is determined from a difference between two electrical signals respectively provided by said first and second motion detectors.

* * * * *